United States Patent [19]
Carter et al.

[11] Patent Number: 5,036,533
[45] Date of Patent: Jul. 30, 1991

[54] SYSTEM FOR PROVIDING AUTOMATIC VOICE MESSAGING IN A DIGITAL NETWORK ENVIRONMENT

[75] Inventors: Howard E. Carter, Denton; Joel A. Pugh, Dallas; Byron C. Pierce, Garland, all of Tex.

[73] Assignee: Messager Partners, Dallas, Tex.

[21] Appl. No.: 478,674

[22] Filed: Feb. 12, 1990

Related U.S. Application Data

[63] Continuation-in-part of Ser. No. 342,480, Apr. 24, 1989, Pat. No. 4,901,341, which is a continuation-in-part of Ser. No. 209,891, Jun. 22, 1988, Pat. No. 4,825,460.

[51] Int. Cl.[5] .................. H04M 1/64; H04M 7/06; H04M 11/00
[52] U.S. Cl. .................................... 379/59; 379/63; 379/88; 379/112; 379/230
[58] Field of Search ................. 379/88, 89, 59, 58, 379/63, 112, 230; 370/61, 62

[56] References Cited

U.S. PATENT DOCUMENTS

| | | | |
|---|---|---|---|
| 4,680,786 | 7/1987 | Baker et al. | 379/60 |
| 4,809,321 | 2/1989 | Morganstein et al. | 379/211 |
| 4,908,850 | 3/1990 | Masson et al. | 379/88 |
| 4,932,042 | 6/1990 | Baral et al. | 379/67 |
| 4,941,167 | 7/1990 | Cannalte et al. | 379/67 |
| 4,959,855 | 9/1990 | Daudelin | 379/213 |

OTHER PUBLICATIONS

"Conversant 1 Voice System: Architecture and Applications", R. J. Perdue et al., AT&T Technical Journal, vol. 65, No. 5, Sep./Oct. 1986, pp. 34–47.

Primary Examiner—Thomas W. Brown
Attorney, Agent, or Firm—David H. Judson

[57] ABSTRACT

The present invention describes an automatic voice messaging system for use in a telephone network having a calling station connectible to a first switch and a called station connectible to a second switch, with the first and second switches connected by a digital serial link. The voice messaging system preferably comprises an interface, a detection circuit, a speech circuit and a control circuit. The interface monitors signals on the digital serial link. The detection circuitry is connected to the interface for detecting busy or ring/no answer conditions at the called station upon call initiation to the called station from the calling station, and for detecting receipt of a predetermined code from the calling station indicating that the caller desires to leave a message for the called station. The speech circuit is also connected to the interface for issuing a predetermined prompt to a user of the calling station. The control circuit is connected to the detection circuit and the speech circuit for controlling the speech circuit to issue one of the predetermined prompts to the calling station upon detection of a busy or ring/no answer condition by the detection circuit, and for thereafter connecting the calling station to a host computer upon detection of the predetermined code by the detection circuit to enable the user to record at the host computer a message for the called station.

12 Claims, 2 Drawing Sheets

SYSTEM FOR PROVIDING AUTOMATIC VOICE MESSAGING IN A DIGITAL NETWORK ENVIRONMENT

This application is a continuation in part of prior co-pending application Ser. No. 07/342,480, filed Apr. 24, 1989, now U.S. Pat. No. 4,901,341, which is a continuation in part of prior application Ser. No. 07/209,891, filed June 22, 1988, now U.S. Pat. No. 4,825,460.

TECHNICAL FIELD

The present invention relates to voice message storage and forward methods and systems and more particularly to an automatic voice messaging system for use in connection with a digital telephone network.

BACKGROUND OF THE INVENTION

It is known in the prior art to carry telephone calls between local telephone operating companies through the AT&T network or through one or more independent inter-exchange carriers such as MCI or Sprint. The local telephone operating companies operate within a so-called local access and transport area (LATA). When a long distance call is dialed, the call is usually transmitted through an operating company central office to a point of termination in the originating LATA at which it is picked up by the inter-exchange carrier and passed by that carrier on to a termination point in a distant LATA. Upon reaching the destination LATA, the call is then transferred by the inter exchange carrier to the local operating company central office within that LATA for ultimate connection to the original called station therein. Typically, the termination points of each LATA include suitable switching circuits, e.g., an access tandem, that are interconnected by a digital serial link. Such digital links are also presently used to interconnect virtually all central offices as well as to interconnect operating company switching networks to one or more cell site control switches of a mobile telephone network.

It is also known in the prior art to provide "automatic voice messaging" where, upon the occurrence of a busy/ring-no-answer condition at a called station, the user of the calling station can be connected to a voice message facility for recording a voice message for subsequent delivery to the called station. Automatic voice messaging has not heretofore been integrated into a telephone network having multiple digital links.

It would therefore be desirable to provide automatic voice messaging in a telephone system having various types of switching circuits that are interconnected via digital serial links.

BRIEF SUMMARY OF THE INVENTION

It is an object of the present invention to provide automatic voice messaging and related caller-controlled applications in digital telephone network.

It is yet another object of the present invention to provide an automatic voice messaging system that is capable of interfacing to an digital communications link located between a pair of switching circuits.

It is another object of the invention to provide automatic voice messaging in a cellular telephone network.

It is a further object of the present invention to use in-band and out of band signaling techniques in connection with the providing of automatic voice messaging services in a digital network environment.

These and other objects of the invention are achieved in a preferred embodiment of the invention wherein an automatic voice messaging system is provided for use in a telephone network having a calling station connectible to a first switch and a called station connectible to a second switch, with the first and second switch means connected by a digital communication link. Preferably, the link is a T-1 span line over which in-band DTMF or FSK signals are provided. The link may also support out-of band signaling such as signaling provided under the common channel signaling ("SS7") protocol. In one embodiment, both the first and second switches are access tandems located at termination points between two LATAs. Alternatively, the first switch is an access tandem and the second switch is a cellular tandem or cell site controller for a mobile telephone system. Such a configuration facilitates the provision of automatic voice messaging in a cellular network. The first and second switches could alternatively be two operating company central offices, or any other switching devices interconnected by a communication link that supports digital signaling.

The voice messaging system preferably comprises a "voice storage unit" or host computer, an interface means, a detection means, speech means and control means. The host computer stores voice messages. The interface means monitors signals on the digital serial link. If the link is a conventional T-1 span line, the interface means includes appropriate T-1 interface circuits. The detection means is connected to the interface means preferably for detecting busy or ring/no answer conditions at the called station upon call initiation to the called station from the calling station, and for detecting receipt of a predetermined code from the calling station preferably indicating that the caller at the calling station desires to leave a message for the called station. The speech means is likewise connected to the interface means for issuing a predetermined prompt to the caller at the calling station. The control means is connected to the detection means and the speech means for controlling the speech means to issue the predetermined prompt to the caller upon detection of a busy or ring/no answer condition by the detection means, and for thereafter connecting the calling station to a host computer upon detection of the predetermined code to thereby enable the caller to record, at the host computer, a message for the called station. The host computer is directly connected to the interface means or, alternatively, is connected to other portions of the network via one or more trunks.

BRIEF DESCRIPTION OF THE DRAWINGS

For a more completed understanding of the present invention and the advantages thereof, reference is now made to the following Description taken in conjunction with the accompanying Drawings in which.

DETAILED DESCRIPTION

Figure 1:
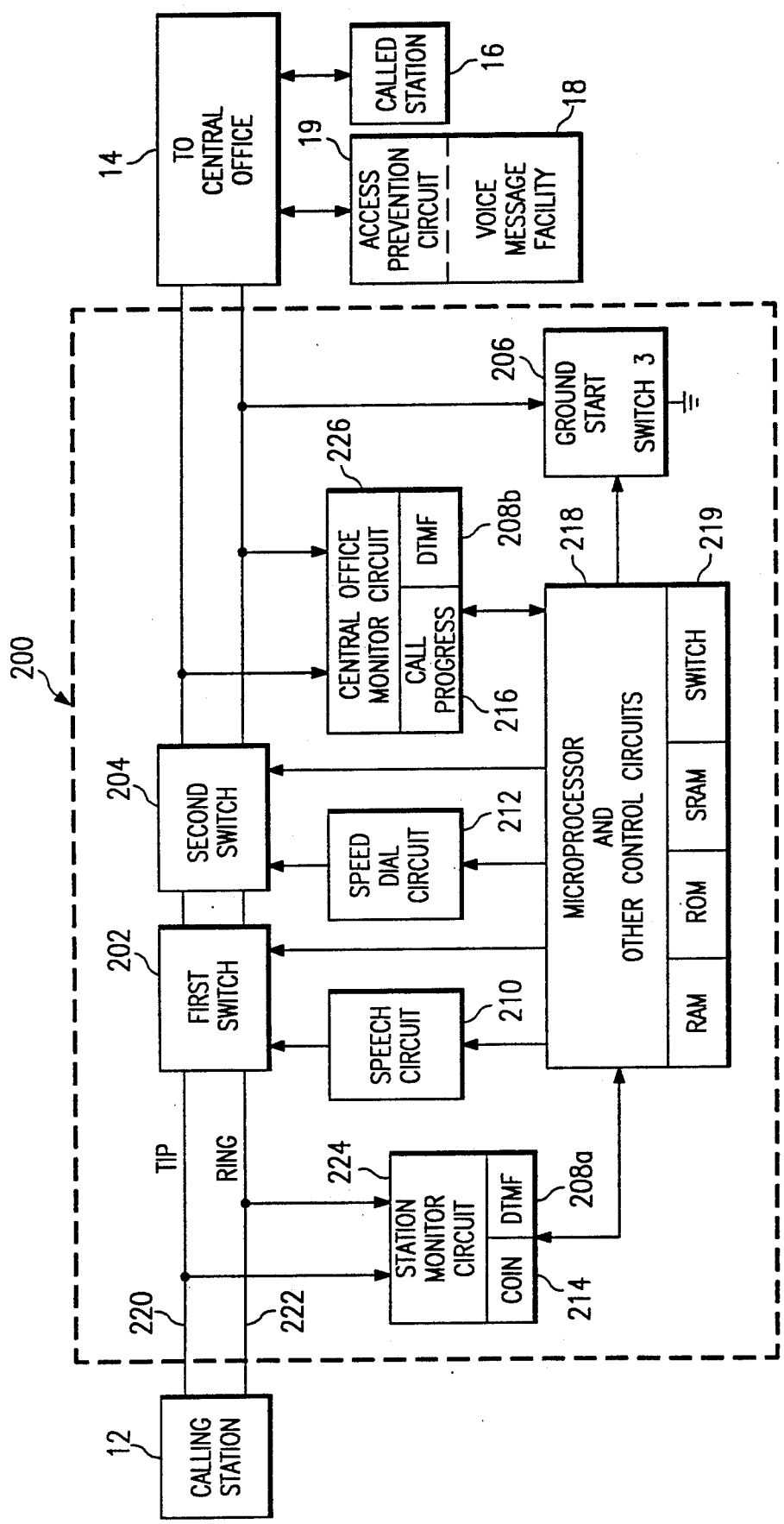
FIG. 1 is a simplified block diagram of a prior line interface unit for an analog environment as described in U.S. Pat. No. 4,825,460 for offering the automatic voice messaging service to a calling station user and connecting the calling station to a voice message facility upon the user's acceptance of the service.

Referring now to the drawings wherein like reference numerals designate like or similar parts throughout the several figures, FIG. 1 is a line interface unit 200 for providing enhanced control of receipt and delivery of voice messages over a telephone system having a voice message facility 18 connectible to at least one calling station 12 and a called station 16 via a central office 14. The line interface unit 200, described in U.S. Pat. No. 4,825,460, advantageously provides certain call intercept and message prompting operations in a standalone unit both externally to the calling station 12 and the voice message facility 18. The interface unit may be located adjacent to the calling station or on the input side of the central office switching eguipment.

As seen in FIG. 1, and as more particularly described in U.S. Pat. No. 4,825,460, the line interface unit 200 comprises a plurality of functional modules including first, second and third switches 202, 204 and 206, respectively, DTMF detector circuits 208a and 208b, a speech circuit 210, a speed-dial circuit 212, a coin detect circuit 214, a call progress detector circuit 216, a control circuit 218, a calling station monitor circuit 224 and a central office monitor circuit 226. The control circuit 218 is preferably a microprocessor based controller having suitable control programs for effecting the operations described below. The control circuit 218 is connected to control the first, second and third switches 202, 204 and 206, as well as the speech circuit 210 and the speed dial circuit 212. The speech circuit 210, the speed dial circuit 212 and/or the control circuit 218 may be shared by a plurality of line interface units each having the disclosed switching and monitoring components.

As described in U.S. Pat. No. 4,825,460, each of the first and second switches are a double pole, double-throw switch located in the tip and ring lines 220 and 222 between the calling station 12 and the central office 14. In particular, the first switch 202 is connected to the calling station 12 in the tip and ring lines 220 and 222 and the second switch 204 is connected to the central office 14 in the tip and ring lines. Each of the switches 202 and 204 have first and second positions such that signals on the tip and ring lines 220 and 222 are connected directly between the calling station 12 and the central office 14 when each of these switches are in the first position. The unit is thus "idle" when the switch contacts of the first and second switches 202 and 204 are in their first position. However, the line interface unit 200 communicates directly with the calling station 12 when the first switch 202 is switched from its first position to its second position. Likewise, the line interface unit communicates directly with the central office 14 when the second switch 204 is switched from its first position to its second position. The unit 200 thus communicates with both the calling station 12 and the central office 14 when the switch contacts of switches 202 and 204 are activated to the second positions. When both switches are in their second position, a small amount of crosstalk between the switches 202 and 204 exists and is advantageously used by the interface unit 200 for the purpose described below. Switching of the second switch 204 between its first and second positions automatically disconnects the calling station from the central office 14 and reorders dialtone to the line interface unit 200.

As noted above, the line interface unit 200 also includes the speech circuit 210 for issuing one or more predetermined (English or bilingual) prompts to the caller at the calling station 12. For example, the speech circuit is controlled by the control circuit 218 to issue a prompt to determine whether the caller at the calling station desires to leave voice message for a called station. If the caller desires to leave a voice message, the control circuit 218 operates to control the speed-dial circuit 212 for speed dialing the voice message facility 18. The control of this operation is effected through sensing of various signals by the line monitor circuits 224 and 226.

In particular, the calling station monitor 224 is connected across the tip and ring lines 220 and 222 adjacent the calling station side of the unit 200. Likewise, the central office monitor circuit 226 is connected across the tip and ring lines adjacent to the central office side of the interface unit 200. The calling station monitor 224 monitors the tip and ring lines for coin detect signals (which are processed by the coin detect circuit 214) or receipt of a predetermined DTMF signal (e.g., a "#" key) from the calling station (which is processed by the DTMF detector circuit 208a). The central office station monitor 226 monitors the tip and ring lines for detecting a predetermined condition at the called station (e.g., a busy/no answer condition) upon call initiation to the called station. Central office monitor circuit 226 also monitors the tip and ring lines for detecting receipt of standard or non standard DTMF signaling which is then processed by the DTMF detected circuit 208b. The control circuit 218 includes a switch 219 for selectively switching the outputs of the DTMF detector circuits 208a and 208b to the control circuit 218.

Although not meant to be limiting, preferably the DTMF detector circuit 208a senses receipt (over the calling station monitor 224) of a standard DTMF signal indicating that the caller at the calling station desires to leave a voice message for the called station. Alternatively, the caller can deposit additional coinage or pull a credit card through a cardreader to indicate his/her intention to record a voice message. The DTMF detector circuit 208b senses receipt (over the central office monitor 226) of a non standard DTMF signal from the voice message facility following the speed-dialing thereto as will be described in more detail below.

The third switch 206 of the line interface unit is connected between the ring line 222 and ground for the purpose of generating a ground start after the speed dial circuit 212 has speed-dialed the voice message facility. This ground start is required to enable the interface unit 200 to complete a connection to the voice message facility 18 through the central office without the caller having to deposit additional coinage in the paystation. As also seen in FIG. 1, the line interface unit 200 includes the coin detect circuit 214 for detecting receipt of coinage in the paystation. Coin detect circuit 214 is preferably coupled to the control circuit 218 to provide a running total of all coins deposited in the calling station over a predetermined time. Moreover, the control circuit 218 can be remotely reprogrammed (e.g., to change the prompt, the language of the prompt, the calling station identification or the number of unanswered rings at the called station which will initiate a call default) through DTMF signaling from a host or handset. To effect reprogramming, the second switch 204 is switched to its second position and the parameter information is down loaded to the microprocessor.

In operation, the control circuit 218 responds to a busy/no answer condition at the called station (following call initiation thereto) for switching the first switch 202 from its first position to its second position. This operation disconnects the calling station handset from the central office and connects the speech circuit 210 to the calling station 12 for issuing the prompt to determine if the caller desires to leave a voice message. After the prompt is issued, the calling station monitor circuit 224 waits for receipt of the DTMF signal from the calling station (or, alternatively, waits for receipt of additional coinage). If no DTMF signal is received (i.e., if the caller does not desire to leave a voice message), the unit 200 remains idle. However, upon detection of the DTMF signal by the DTMF detector circuit 208a (or the detection of additional coinage by coin detector 214 as the case may be), the control circuit 218 responds by switching the second switch 204 from its first position to its second position. This switching reorders dialtone and connects the speed-dial circuit 212 to the central office 14 for dialing the voice message facility 18. The central office monitor circuit 226 then waits for receipt of the DTMF signal from the voice message facility. The control circuit 218 then responds to detection of the DTMF signal by the DTMF detector circuit 208b for effecting a "handshake" to the voice message facility and then switching the first and second switches 202 and 204 from their respective second positions back to their respective first positions to thereby connect the calling station 12 to the voice message facility 18.

As noted above, when the calling station 12 is a paystation, the line interface unit 200 must present a ground start to the central office 14 in order to dial the voice message facility 18 without additional coinage. To this end, the control circuit 218 operates to activate the third switch 206 connected between the ring line 222 and ground for generating a ground start after the voice message facility 18 has been dialed by the speed-dial circuit 212. This ground start is typically performed immediately after the last digit of the voice message facility is dialed by the speed-dial circuit and enables the interface unit to complete a connection to the message facility without the caller having to deposit additional coinage. After the ground start, the control circuit 218 is responsive to receipt of the preferably non-standard DTMF signal from the voice message facility 18 for switching the first and second switches from their respective second positions back to their respective first positions. This operation connects the calling paystation to the voice message facility. The use of non-standard DTMF signaling increases security of the transmissions between the calling station and the voice message facility.

The line interface unit 200 provides a so called "voice over" operation wherein the caller at the calling station 12 is allowed to continue to monitor the call progress (i.e., the ringing on the line) while being prompted to leave a message. In this embodiment, the control circuit 218 is responsive to a predetermined condition at the called station (e.g., three (3) rings with no answer) for switching the first and second switches from their respective first positions to their respective second positions. This operation connects the speech circuit 210 to the calling station 12 for issuing the prompt while simultaneously enabling the caller at the calling station to continue to monitor the progress of the call. After the prompt is issued during the voice over operation, the control circuit 218 is responsive to receipt of a DTMF signal from the calling station 12 for switching the second switch from its second position to its first position and then back to its second position. This operation reorders dialtone to the interface unit 200 and then connects the speed-dial circuit 212 to the central office for dialing the voice message facility 18. After dialing the voice message facility, the control circuit is responsive to receipt of the DTMF signal from the voice message facility for switching the first and second switches from their respective second positions back to their respective first positions and thereby connect the calling station to the voice message facility.

Before the first and second switches are returned to their first position to connect the calling station to the voice message facility, the line interface unit 200 performs a "handshake" with the voice message facility 18. In particular, the control circuit 218 transmits a predetermined data string to the voice message facility 18. This data string may have the following format —"#", "#", (10-digit number of calling station, "#", (1-digit activity code), "#", (called station number), "#"—. The data string may also include a credit card number or other billing information. The "#" sign delimits the fields of the data string. The activity code informs the voice message facility 18 or other host that an alternative prompt has been made (e.g., a bilingual prompt). Alternatively, the activity code is a special code indicating that connection is required to an alternate voice message facility, that the calling station includes a facsimile apparatus, that certain coinage has been deposited or that certain keypad signals have been received indicating acceptance of the service. One or more of the "#" signs at the beginning of the data string described above may alternatively be non-standard DTMF signaling (such as an "A") for increased security. When the voice message facility receives the data string, it transmits an "acknowledge" signal (e.g., an "*") back to the unit or requests retransmission if the data has not been received. Upon receipt of the acknowledge signal, the control circuit 218 switches the first and second switches back to their respective first positions.

The voice message facility may include access prevention circuitry and/or algorithms to prevent receipt and/or forwarding of voice messages unless predetermined access codes are presented to the system. In this case, the data string from the interface unit 200 should then include a predetermined "key" that "unlocks" the voice message facility's access prevention circuits and algorithms. According to the present invention, the "key" provided to unlock the voice message facility is preferably part of the data string transmitted to the facility during the handshake process. In particular, but without meant to be limiting, the "key" comprises three elements: the number of the calling station or "ANI", a predetermined number of digits representing the destination number, and some billing information for use in billing the user of the calling station for the caller controlled message delivery service. The access prevention circuitry of the voice message facility is then pre-programmed to search for a data string with these components. The actual destination number is not relevant as long as the data string includes the proper number of digits for this number. If a data string received by the message center does not include these components in the required predetermined order and/or without the proper number of expected digits, no acknowledge signal is returned to the interface unit and the unit is disconnected from the message center. If the data string includes the proper "key," however, the voice message facility becomes "barrierless" to the voice message subsequently transmitted from the calling station. The stored voice message can then be subsequently forwarded without input of the access codes normally required by the voice mail system.

While in the preferred embodiment the line interface unit 200 is adapted for use with a single calling station, a plurality of calling stations may be selectively switched to a single interface unit. Moreover, although not discussed in detail, it should be appreciated that other forms of signaling may be used in the invention. For example, the control circuit 218 may include appropriate circuitry for processing FSK signaling if desired. Further, the control circuit 218 of the line interface unit 200 may alternatively include appropriate software to perform automatic number identification ("ANI") following the caller's affirmative decision to leave a voice message. This ANI function is advantageous when the calling station and the called station are INTRALATA.

Figure 2:
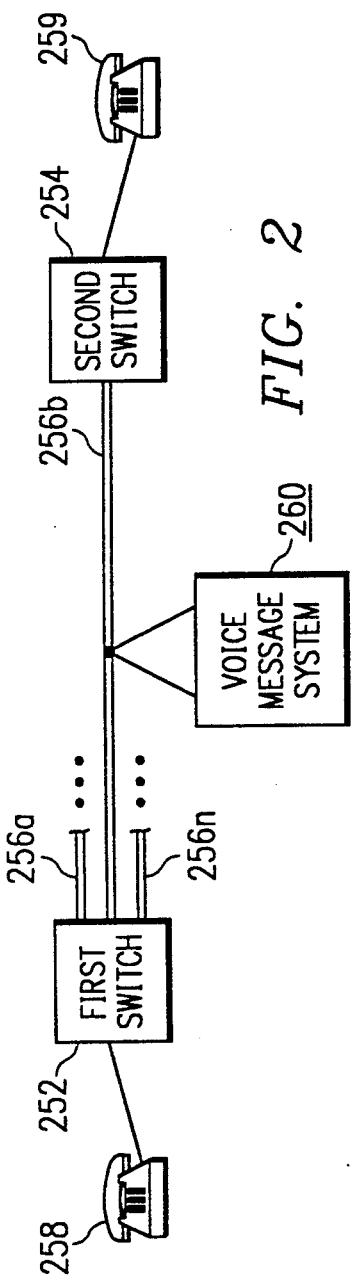
FIG. 2 is a block diagram of a digital telephone network in which, the automatic voice messaging system of the present invention is preferably incorporated.

Referring now to FIG. 2, a block diagram is shown of a generic digital telephone network 250 in which an automatic voice message system is advantageously provided according to the teachings of the present invention. The telephone network generally includes a first switch 252, a second switch 254, and a plurality of digital communications links interconnecting the first and second switches 252 and 254 and designated by the reference numerals 256a-n. At least one digital link 256 is preferably a high speed (1.544 MHz) T-1 span over which conventional in-band signaling is provided in a serial fashion; of course, other higher speed links such as DS/3 or DS/4 can be used. Link 256, alternatively, is a high speed digital serial link over which digital signals are provided using out-of-band signaling with other communications protocols, such as X.25 or common channel signaling (SS7).

For purposes of generalizing the features of the invention, FIG. 2 shows a calling station 258 connected (or connectible via a central office or the like) to the first switch 252 and a called station 259 connected (or connectible) to the second switch 254. For the remainder of the discussion, it is assumed that a call to the called station 259 is initiated by a caller at the calling station 258. According to the present invention, an automatic voice messaging system 260 is placed across or in a digital link 256 for enabling receipt and delivery of voice messages under the control and at the expense of the caller at the calling station 258.

Without limiting the foregoing, the first and second switches 252 and 254 are access tandems located at termination points between two LATAs. Alternatively, the first switch 252 is an access tandem and the second switch 254 is a cellular tandem or cell site controller for a mobile telephone system. In this configuration, the network 250 is a cellular telephone network. The first switch 252 may be an operating company central office while the second switch 254 is an access tandem. The first and second switches can interconnect two central offices. The first switch can be an IXC switching system and the second switch can be a cellular tandem or central office. Both switches may be cellular tandems or components of a cellular telephone system.

Figure 3:
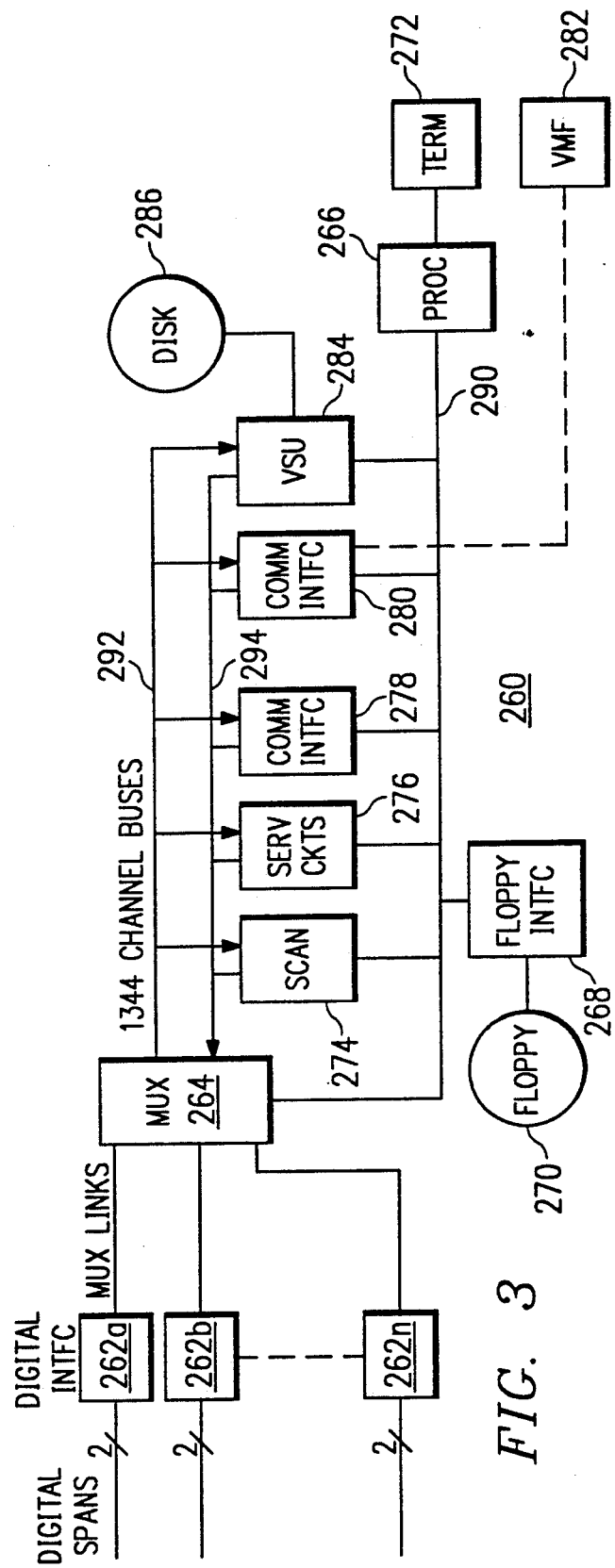
FIG. 3 is a detailed block diagram of the preferred embodiment of the automatic voice messaging system of FIG. 2.

Referring now to FIG. 3, a detailed block diagram is shown of the preferred embodiment of a digital caller-controlled automatic voice message system 260 for use in a digital network environment. System 260 preferably includes an interface means including a plurality of interface circuits 262a-n each connected to a multiplexer 264. The multiplexer includes a control bus connected to a control means comprising a processor 266, storage interface 268, storage device 270 and input/output device 272. The processor is controlled in a conventional manner by suitable application programs stored in the storage device 270. Input/output device is used to modify the system operation by entering suitable program commands to the control means.

The system 260 further includes a number of circuits for facilitating the intercept, prompting and redirect functions associated with the automatic voice messaging service. A scanner circuit 274 is provided to identify Feature Group D supervision or other similar information depending on the type of signaling used. A service circuit 276 includes all of the necessary call progress (busy/ring no answer) detection circuits, speech generation circuits, and service acceptance (e.g., DTMF) detection circuits. The service circuit 276 also preferably includes appropriate circuitry for capturing ANI, DNI and billing information. A first communication interface 278 is provided to receive, interpret, format and transmit SS7 messages as will be described in more detail below. The system preferably also includes a second communication interface 280 connected to a voice message facility platform 282. The platform 282 includes a billing computer and other appropriate devices for transaction processing and accounting purposes. The system 260 advantageously includes its own dedicated voice storage unit 284 for storing voice messages. A disk storage 286 is connected to the voice storage unit 284. The voice message storage may take place either in the voice storage unit or in the platform, as is appropriate, to facilitate subsequent delivery.

Each of the circuits 274, 276, 278, 280 and 284 are connected to the processor 266 via the control bus 290. Input/output channel buses 292 and 294 also interconnect these circuits to the multiplexer of the interface means. Preferably, the interface means includes twenty eight (28) T-1 interface circuits, each of which is connected to two digital links. Each T-1 interface circuit includes first and second T-1 interface circuits, with the first interface circuit connected to one of the digital links and the second interface circuit connected to the other digital link. The first and second digital links are thus connectible to bypass their respective interface circuit if the the first and second T-1 interfaces are interconnected by means of a switch between the T-1 interfaces. Given this architecture, i.e., with 28 T-1 spans each carrying twenty four (24) channels, the buses 292 and 294 service 1344 channels.

In operation, the scanner 274, service circuit 276 and/or communications interface 278 monitor the received signaling to determine the state of the call progress. Of course, the actual circuit used depends on the type of signaling. If an SS7 protocol is used, communications interface 278 monitors the line. If Feature Group D or other types of signaling are used, scanner 274 is used, and so forth. When call processing is required due to a busy or ring/no answer condition, the processor 266 activates the service circuits 276 to thereby issue the prompt offering and monitor the line for acceptance of the service. Processor 266 also controls the circuit 276 to capture ANI, DNI and billing information. If the service is accepted, the service circuit 276 notifies the processor 266, which then controls the service circuit to issue appropriate prompts to the caller to instruct the caller to begin recording the message. The message is then recorded by the voice storage unit 284, and the processor controls the service circuit 276 to transfer the ANI, DNI, and billing information to the platform 282. Although not meant to be limiting, preferably voice messages are stored in the voice storage unit 284 or its associated disk storage, while ANI, billing and other management information reside in the platform 282.

For message delivery, the platform ships the message routing information (i.e., the ANI, etc.) back to the voice storage unit 284, and the processor 266 then locates an open channel on a link for outdialing to the original called station. The service circuit then dials the call. When the call is placed, the scanner 274 watches the call states for on hook/off hook detection. If off-hook is detected, the service circuit 276 issues a prompt announcing the message which is then delivered by the voice storage unit 284. When the message is delivered, the processor 266 notifies the platform and the routing information for the message is deleted.

If desired, the system 260 is connectible to a remote host computer via a communications interface which in turn is connected to the remote host via an RS-232 link or the like. This enables messages to be transferred to another location for the subsequent outdial attempts.

The system 260 described in FIG. 3 advantageously allows automatic voice messaging and other related caller-controlled functions to be provided in many different types of applications. One such application is in the cellular communications environment. Referring simultaneously to FIGS. 2 and 3, assume the caller at the calling station 258 attempts to call the called mobile station 259 but the call cannot be completed because the called party is on the phone or away from his/her car. The voice message system 260 intercepts the call and offers to attempt to deliver (by example) a one-minute message to the called station every ten minutes for three hours, for a predetermined fee, to be billed to the calling party. When the service is accepted, the system connects the caller to the voice storage unit or other adjunct host computer which records the message and billing information, makes the delivery attempts and maintains accounting records. The operation is likewise available if the calling party is the mobile station and the called party is, for example, a residential phone or a business extension located behind a private branch exchange.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. An automatic voice messaging system for use in a telephone network having a first switch means and a second switch means connected by a plurality of digital serial links, comprising:
   processor means for controlling the operation of the voice messaging system;
   a plurality of interface circuits for interfacing to the digital serial links;
   a multiplexer connected to the plurality of interface circuits and having an output bus, the multiplexer being controlled by the processor means to selectively connect telephone signals from the digital serial links to the output bus;
   caller-controlled automatic voice messaging service means connected to the output bus of the multiplexer and being controlled by the processor means for providing automatic voice messaging for the plurality of digital links, the automatic voice messaging service means comprising:
      means for detecting telephone signals representing busy or ring/no answer conditions at a called station upon call initiation to the called station by a caller at a calling station;
      means for informing the caller of availability of automatic voice messaging services;
      means for detecting receipt of a predetermined acceptance code from the calling station indicating that the caller desires to leave a message for the called station;
      means for determining ANI or billing information from the caller at the calling station;
      storage means connectable to the multiplexer by the processor means following receipt of the predetermined acceptance code for receiving and storing a message for the called station, and for storing ANI or billing information;
      means for signaling the called station;
      means for locating an open digital serial link and for connecting the signaling means to the open digital serial link to signal the called station; and
      means responsive to the called station going off-hook for delivering the message to the called station.

2. The automatic voice messaging system as described in claim 1 wherein the first switch means is an access tandem and the second switch means is a cellular tandem for a mobile telephone system.

3. The automatic voice messaging system as described in claim 1 wherein the first switch means is a central office and the second switch means is an access tandem.

4. The automatic voice messaging system as described in claim 1 wherein the first switch means is switching system for an inter exchange carrier and the second switch means is an access tandem.

5. The automatic voice messaging system as described in claim 1 wherein the first switch means is a central office and the second switch means is a central office.

6. The automatic voice messaging system as described in claim 1 wherein the first switch means is a cellular tandem and the second switch means is cellular tandem.

7. The automatic voice messaging system as described in claim 1 wherein the first switch means is a central office and the second switch means is a cellular tandem.

8. The automatic voice messaging system as described in claim 1 wherein the first switch means is a switching system for an inter exchange carrier and the second switch means is a cellular tandem.

9. The automatic voice messaging system as described in claim 1 wherein the first switch means is a switching system for an inter exchange carrier and the second switch means is a central office.

10. The automatic voice messaging system as described in claim 1 wherein the signals on the digital serial link are in-band signals.

11. The automatic voice messaging system as described in claim 1 wherein the signals on the digital serial link are out-of-band signals.

12. The automatic voice messaging system as described in claim 11 wherein the out of band signals are provided according to the common channel signaling system No. 7 (SS7) protocol.

* * * * *